(12) United States Patent
Tsuchiya

(10) Patent No.: US 8,016,063 B2
(45) Date of Patent: Sep. 13, 2011

(54) STRUCTURE FOR MOUNTING POWER SUPPLY APPARATUS ON VEHICLE

(75) Inventor: Takenori Tsuchiya, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 374 days.

(21) Appl. No.: 12/296,355

(22) PCT Filed: Mar. 13, 2007

(86) PCT No.: PCT/JP2007/055592
§ 371 (c)(1),
(2), (4) Date: Oct. 7, 2008

(87) PCT Pub. No.: WO2007/125694
PCT Pub. Date: Nov. 8, 2007

(65) Prior Publication Data
US 2009/0183935 A1    Jul. 23, 2009

(30) Foreign Application Priority Data

Apr. 28, 2006    (JP) .................................. 2006-125649

(51) Int. Cl.
*B60R 16/04* (2006.01)
(52) U.S. Cl. ...................................... 180/68.5; 180/68.1
(58) Field of Classification Search .............. 180/65.21, 180/65.29, 68.1, 68.5, 68.2
See application file for complete search history.

(56) References Cited

U.S. PATENT DOCUMENTS

| | | | | |
|---|---|---|---|---|
| 5,269,187 A * | 12/1993 | Hanson | ........................... | 73/495 |
| 5,378,555 A * | 1/1995 | Waters et al. | ................... | 429/97 |
| 5,392,873 A * | 2/1995 | Masuyama et al. | .......... | 180/68.5 |
| 5,490,572 A * | 2/1996 | Tajiri et al. | ................... | 180/65.1 |
| 5,639,571 A * | 6/1997 | Waters et al. | ................... | 429/71 |
| 5,641,031 A * | 6/1997 | Riemer et al. | ................. | 429/423 |
| 5,736,272 A * | 4/1998 | Veenstra et al. | ................ | 429/99 |
| 5,882,213 A * | 3/1999 | Witek et al. | ................... | 439/76.2 |
| 5,994,789 A * | 11/1999 | Ochiai | ........................ | 307/10.1 |
| 6,094,927 A * | 8/2000 | Anazawa et al. | ............... | 62/239 |
| 6,632,560 B1* | 10/2003 | Zhou et al. | ....................... | 429/99 |
| 6,662,891 B2* | 12/2003 | Misu et al. | ................... | 180/68.1 |
| 6,811,197 B1* | 11/2004 | Grabowski et al. | .......... | 296/37.8 |
| 6,819,085 B2* | 11/2004 | Kimoto | ......................... | 320/150 |
| 6,902,020 B2* | 6/2005 | Kronner et al. | .............. | 180/68.5 |
| 6,935,449 B2* | 8/2005 | Chernoff et al. | ............. | 180/65.1 |
| 7,048,321 B2* | 5/2006 | Bandoh et al. | ............... | 296/37.8 |

(Continued)

FOREIGN PATENT DOCUMENTS

JP    5-8663 A    1/1993

(Continued)

*Primary Examiner* — J. Allen Shriver, II
*Assistant Examiner* — Jacob Meyer
(74) *Attorney, Agent, or Firm* — Sughrue Mion, PLLC

(57) ABSTRACT

A structure for mounting a power supply apparatus on a vehicle includes a driver's seat and a passenger's seat installed within a vehicle compartment and aligned in the vehicle width direction, an instrument panel provided at the vehicle front inside the vehicle compartment and equipped with electronics, a battery pack assembly located between the driver's seat and the passenger's seat, and wire harnesses electrically connected to the battery pack assembly. The vehicle front side and the vehicle upper side of the wire harnesses face the battery pack assembly. With the above-described configuration, there is provided a structure for mounting a power supply apparatus on a vehicle where the electronics provided at the instrument panel are appropriately protected from an electromagnetic wave.

9 Claims, 6 Drawing Sheets

U.S. PATENT DOCUMENTS

| | | | |
|---|---|---|---|
| 7,079,379 B2 * | 7/2006 | Yamaguchi et al. | 361/676 |
| 7,240,752 B2 * | 7/2007 | Takahashi et al. | 180/68.1 |
| 7,353,900 B2 * | 4/2008 | Abe et al. | 180/68.5 |
| 7,419,209 B1 * | 9/2008 | Mangiapane et al. | 296/208 |
| 7,424,926 B2 * | 9/2008 | Tsuchiya | 180/68.5 |
| 7,427,093 B2 * | 9/2008 | Watanabe et al. | 296/37.15 |
| 7,631,711 B2 * | 12/2009 | Kubo | 180/68.1 |
| 7,654,351 B2 * | 2/2010 | Koike et al. | 180/68.5 |
| 7,678,494 B2 * | 3/2010 | Tsuchiya | 429/120 |
| 7,810,596 B2 * | 10/2010 | Tsuchiya | 180/68.5 |
| 7,819,215 B2 * | 10/2010 | Tsuchiya | 180/68.5 |
| 2001/0030069 A1 * | 10/2001 | Misu et al. | 180/68.1 |
| 2004/0232672 A1 * | 11/2004 | Bandoh et al. | 280/735 |
| 2005/0011692 A1 * | 1/2005 | Takahashi et al. | 180/68.5 |
| 2005/0285563 A1 * | 12/2005 | Yoneda | 320/112 |
| 2006/0073378 A1 * | 4/2006 | Hamery et al. | 429/120 |
| 2006/0087582 A1 * | 4/2006 | Scharenbroch et al. | 348/370 |
| 2006/0096797 A1 * | 5/2006 | Tsuchiya | 180/68.5 |
| 2006/0237248 A1 * | 10/2006 | Hayashi | 180/68.5 |
| 2007/0289789 A1 * | 12/2007 | Tsuchiya | 180/68.2 |
| 2007/0292752 A1 * | 12/2007 | Tsuchiya | 429/120 |
| 2008/0047767 A1 * | 2/2008 | Tsuchiya | 180/68.5 |
| 2008/0164081 A1 * | 7/2008 | Watanabe et al. | 180/65.2 |
| 2008/0257624 A1 * | 10/2008 | Kubo | 180/68.1 |
| 2008/0296935 A1 * | 12/2008 | Mangiapane et al. | 296/208 |
| 2009/0183935 A1 * | 7/2009 | Tsuchiya | 180/68.1 |
| 2010/0231035 A1 * | 9/2010 | Tsuchiya et al. | 307/9.1 |

FOREIGN PATENT DOCUMENTS

| | | |
|---|---|---|
| JP | 11-89009 A | 3/1999 |
| JP | 2000-182583 A | 6/2000 |
| JP | 2001-105893 A | 4/2001 |
| JP | 2001-294048 A | 10/2001 |
| JP | 2004-022267 A | 1/2004 |
| JP | 2004-148849 A | 5/2004 |
| JP | 2004-345447 A | 12/2004 |
| JP | 2005-1655 A | 1/2005 |
| JP | 2005-047489 A | 2/2005 |
| JP | 2005-247064 A | 9/2005 |
| JP | 2005-271878 A | 10/2005 |
| JP | 2006-80042 A | 3/2006 |
| JP | 2007-15616 A | 1/2007 |
| WO | 2005/051697 A1 | 6/2005 |
| WO | 2006/109413 A1 | 10/2006 |
| WO | 2007/029838 A1 | 3/2007 |

* cited by examiner

STRUCTURE FOR MOUNTING POWER SUPPLY APPARATUS ON VEHICLE

TECHNICAL FIELD

The present invention generally relates to a structure for mounting a power supply apparatus on a vehicle. More particularly, the present invention relates to a structure for mounting a power supply apparatus on a vehicle where a power supply portion is housed within a center console.

BACKGROUND ART

As to a conventional structure for mounting a power supply apparatus on a vehicle, U.S. Pat. No. 5,378,555, for example, discloses a battery pack for an electric vehicle (Patent Document 1). According to Patent Document 1, the battery pack includes a lower-tier battery nested in a supporting tray, and an upper-tier battery laid on the lower-tier battery.

Japanese Patent Laying-Open No. 11-89009 discloses a battery cooling structure for an electric vehicle that can improve the cooling efficiency of a battery without causing problems of the space for placement or structural complications (Patent Document 2). According to Patent Document 2, a direct current (DC)-DC converter converting a battery voltage into a prescribed voltage or the like is housed in a position surrounded by the battery within a battery case.

Connected to the battery pack as disclosed in Patent Document 1 are electrical components through which a high-voltage current flows, such as a converter stepping up or down a voltage output at a battery, a relay controlling a high-voltage circuit of the battery and an output cable of the battery. In a case where the battery is mounted between the driver's seat and the passenger's seat, however, these electrical components are located in the proximity of an instrument panel. Therefore, an electromagnetic wave emitted from the electrical components might cause a malfunction or noise of electronics provided at the instrument panel.

DISCLOSURE OF THE INVENTION

In order to solve the above-described problems, an object of the present invention is to provide a structure for mounting a power supply apparatus on a vehicle where electronics provided at an instrument panel are appropriately protected from an electromagnetic wave.

A structure for mounting a power supply apparatus on a vehicle according to the present invention includes a first seat and a second seat installed within a vehicle compartment and aligned in a vehicle width direction, an instrument panel installed at a vehicle front inside the vehicle compartment and equipped with electronics, a power supply portion located between the first seat and the second seat, and an electrical component electrically connected to the power supply portion. A vehicle front side and a vehicle upper side of the electrical component face the power supply portion.

According to the structure for mounting a power supply apparatus on a vehicle configured in the above-described manner, the instrument panel is shielded by the power supply portion from the electrical component. Therefore, arrival of an electromagnetic wave emitted from the electrical component at the electronics provided at the instrument panel can be suppressed. As a result, the electronics can be appropriately protected from the electromagnetic wave.

Preferably, the electronics are provided at a position higher than the electrical component. According to the structure for mounting a power supply apparatus on a vehicle configured in the above-described manner, an electromagnetic wave from the upper side of the electrical component will readily reach the electronics. Therefore, the upper side of the electrical component is covered with the power supply portion. Thus, arrival of the electromagnetic wave at the electronics can be prevented more effectively.

Preferably, the power supply portion includes a side located at a vehicle rear side. A recess is formed in such a manner that the side is set back toward a vehicle front. The electrical component is located in the recess. According to the structure for mounting a power supply apparatus on a vehicle configured in the above-described manner, the recess formed in the side of the power supply portion is used as the space for placement of the electrical component.

Preferably, the power supply portion includes a first power supply portion and a second power supply portion. The first power supply portion and the second power supply portion have a first side and a second side, respectively, located at the vehicle rear side. The recess is formed in such a manner that the second power supply portion is provided on the first power supply portion, and the second side is located more rear than the first side. According to the structure for mounting a power supply apparatus on a vehicle configured in the above-described manner, the recess is formed depending on the manner of the first power supply portion and the second power supply portion that are laid one above the other.

Preferably, the structure for mounting a power supply apparatus on a vehicle further includes a metallic floor panel provided on a floor inside the vehicle compartment. The first power supply portion is installed on the floor panel. The electrical component has three sides surrounded by the first power supply portion, the second power supply portion and the floor panel. According to the structure for mounting a power supply apparatus on a vehicle configured in the above-described manner, arrival of an electromagnetic wave emitted from the electrical component at the electronics provided at the instrument panel can be suppressed more effectively.

Preferably, the first power supply portion and the second power supply portion include a plurality of power supply cells that are stacked and electrically connected to one another, respectively. The power supply cells that are included in the second power supply portion and stacked in a longitudinal direction of the vehicle are larger in number than the power supply cells that are included in the first power supply portion and stacked in the longitudinal direction of the vehicle. According to the structure for mounting a power supply apparatus on a vehicle configured in the above-described manner, the second power supply portion having the second side located more rear than the first side is configured such that more power supply cells are stacked than those in the first power supply portion.

Preferably, the first power supply portion and the second power supply portion include a plurality of power supply cells that are stacked and electrically connected to one another, respectively. The power supply cells included in the second power supply portion are larger in number than the power supply cells included in the first power supply portion. The structure for mounting a power supply apparatus on a vehicle further includes a first exhaust passage through which a cooling air having cooled the plurality of power supply cells is discharged from the first power supply portion, and a second exhaust passage through which a cooling air having cooled the plurality of power supply cells is discharged from the second power supply portion. The first exhaust passage and the second exhaust passage extend independently of each other. Electrical equipment is installed on a path of the first exhaust passage.

According to the structure for mounting a power supply apparatus on a vehicle configured in the above-described manner, the electrical equipment is installed on a path of the first exhaust passage through which the cooling air is discharged from the first power supply portion having the smaller number of the stacked power supply cells. As a result, a difference between a pressure loss on the path of the cooling air flowing through the first power supply portion and the first exhaust passage in turn and a pressure loss on the path of the cooling air flowing through the second power supply portion and the second exhaust passage in turn can be lessened.

Preferably, the first seat and the second seat include a driver's seat and a passenger's seat, respectively. The structure for mounting a power supply apparatus on a vehicle includes a center console installed between the driver's seat and the passenger's seat and housing the power supply portion, and a rear seat installed at a vehicle rear of the driver's seat and the passenger's seat. The center console includes a sidewall located at the vehicle rear side and curved toward the recess. According to the structure for mounting a power supply apparatus on a vehicle configured in the above-described manner, the sidewall of the center console is formed so as to be curved toward the recess, so that enough legroom for the rear seat can be ensured.

As described above, according to the present invention, there can be provided a structure for mounting a power supply apparatus on a vehicle where electronics provided at an instrument panel are appropriately protected from an electromagnetic wave.

BEST MODES FOR CARRYING OUT THE INVENTION

Figure 1:
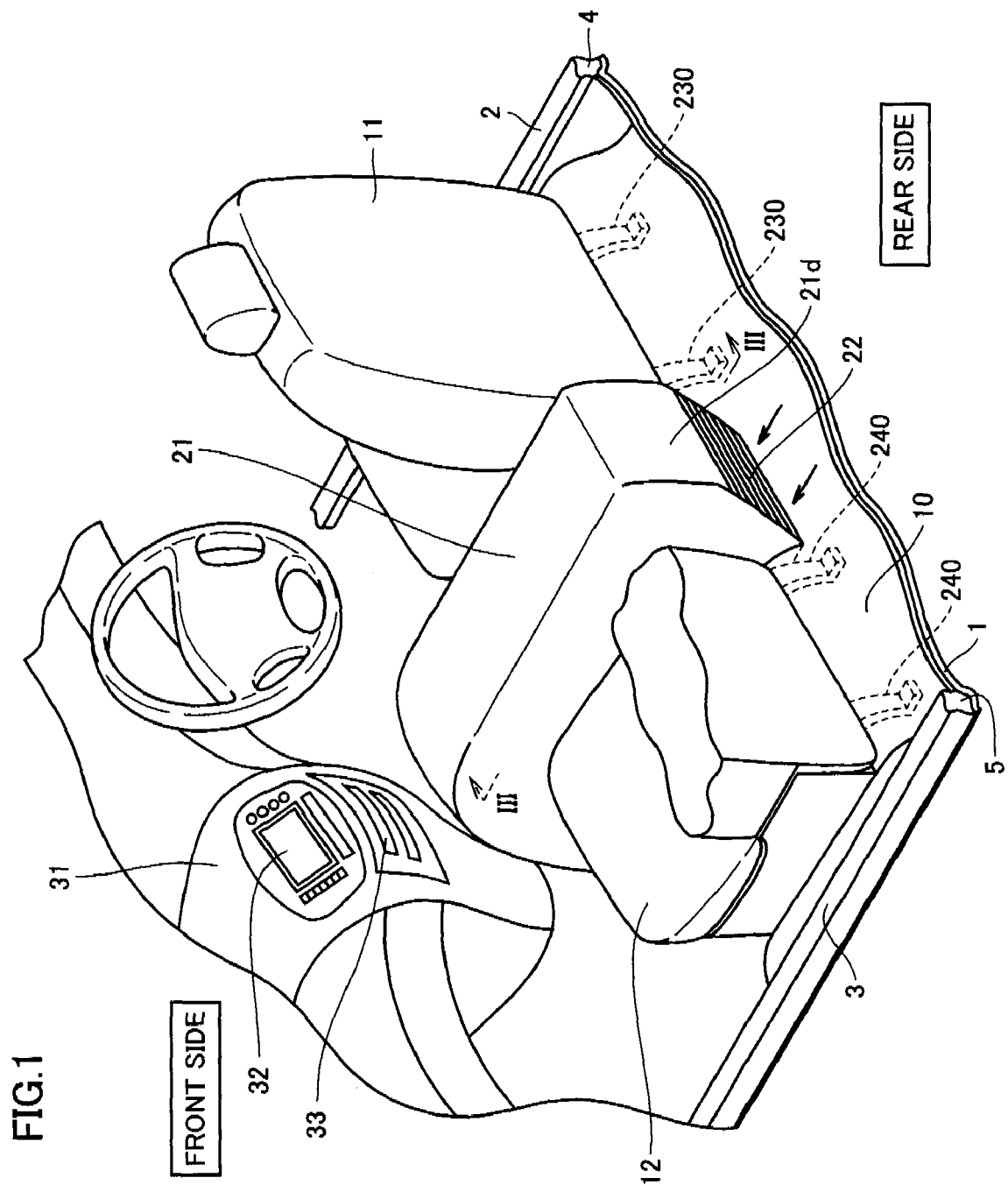
FIG. 1 is a perspective view of the inside of a vehicle compartment of a hybrid vehicle.

The embodiments of the present invention will be described with reference to the drawings. In the drawings referenced hereinafter, the same or corresponding components are represented by the same reference numerals. In the present embodiments, the frontward side in the longitudinal direction of a vehicle (the vehicle front) may be simply called "the front," and the rearward side in the longitudinal direction of the vehicle (the vehicle rear) may be simply called "the rear."

FIG. 1 is a perspective view of the inside of a vehicle compartment of a hybrid vehicle. FIG. 1 shows a hybrid vehicle powered by an internal combustion engine such as a gasoline engine or a diesel engine, as well as a chargeable and dischargeable power supply.

Referring to FIG. 1, inside the vehicle compartment, a driver's seat 11 and a passenger's seat 12 serving as front seats are provided side by side in the vehicle width direction. Rear seats that are not shown are provided at the rear of driver's seat 11 and passenger's seat 12. Driver's seat 11 and passenger's seat 12 are fixed to a floor panel 1 through seat legs 230 and seat legs 240, respectively. Floor panel 1 is made of metal. Seat legs 230 and 240 extend in the longitudinal direction of the vehicle and have a shape of an arch projecting upward from floor panel 1. A floor carpet 10 is located on a surface of floor panel 1. Floor carpet 10 is provided so as to cover and hide seat legs 230 and 240. Under driver's seat 11 and passenger's seat 12, a cavity is formed between floor panel 1 and floor carpet 10.

A scuff plate 2 and a scuff plate 3 are disposed at the side of driver's seat 11 and at the side of passenger's seat 12, respectively. Scuff plates 2 and 3 are located on the periphery inside the vehicle compartment. Scuff plates 2 and 3 extend in the longitudinal direction of the vehicle. Scuff plates 2 and 3 are provided so as to cover welds formed on floor panel 1. Wirings that are not shown are arranged in a cavity 4 surrounded by scuff plate 2 and floor panel 1 as well as in a cavity 5 surrounded by scuff plate 3 and floor panel 1.

A center console box 21 made of resin and extending in the longitudinal direction of the vehicle is provided between driver's seat 11 and passenger's seat 12. Center console box 21 has a substantially rectangular parallelepiped shape. Center console box 21 is installed near the center of the vehicle in the vehicle width direction. Center console box 21 is installed, for example, to improve the interior aesthetics in the vehicle compartment or to provide a cup holder for the placement of a beverage container or a recess in which small articles can be placed. Formed at center console box 21 are air introduction slits 22 through which air inside the vehicle compartment is drawn into center console box 21.

An instrument panel 31 is installed in front of center console box 21. Instrument panel 31 is installed adjacent to a windshield at the front inside the vehicle compartment. Center console box 21 and instrument panel 31 are provided so as to stand face to face directly in the longitudinal direction of the vehicle. A car navigation system 32 and an audio system 33 such as a CD player or an MD player are provided at instrument panel 31.

Figure 2:
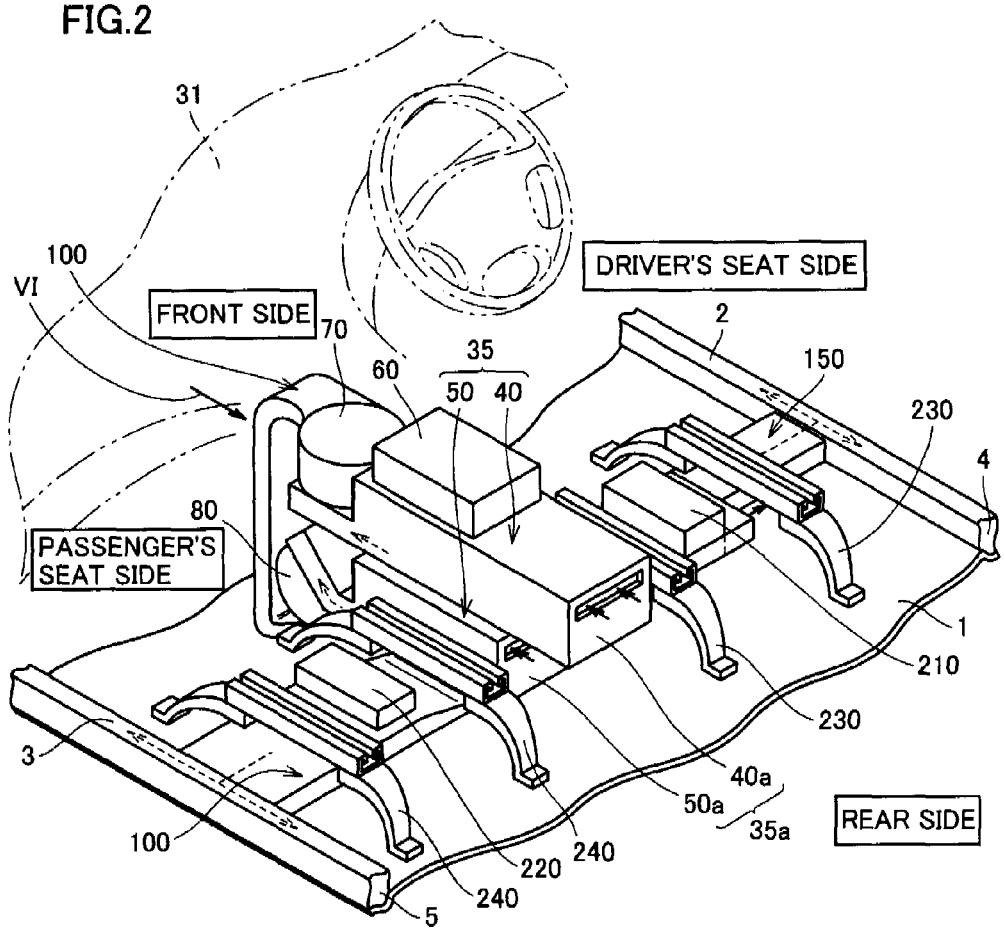
FIG. 2 is a perspective view of a power supply apparatus mounted on the hybrid vehicle in FIG. 1.

FIG. 2 is a perspective view of a power supply apparatus mounted on the hybrid vehicle in FIG. 1. Referring to FIGS. 1 and 2, a battery pack assembly 35 and a junction box 60 electrically connected to battery pack assembly 35 are housed within center console box 21. Battery pack assembly 35 includes a first battery pack 50 and a second battery pack 40. First battery pack 50 and second battery pack 40 are provided one above the other. Second battery pack 40 is located on the upper side of first battery pack 50.

Junction box 60 is located on the upper side of second battery pack 40. Mounted in junction box 60 are peripheral equipment such as a battery computer, a relay controlling a high-voltage circuit of a battery, various sensors sensing a total voltage of the battery as well as a charging and discharging current, a service plug disconnecting the high-voltage circuit at the time of inspection and maintenance of the battery packs, and the like.

Furthermore, a first cooling fan 80 and a second cooling fan 70 are housed within center console box 21. First cooling fan 80 is located between first battery pack 50 and instrument panel 31. Second cooling fan 70 is located between second battery pack 40 and instrument panel 31. First cooling fan 80 and second cooling fan 70 cause a cooling air to be flown to the inside of first battery pack 50 and second battery pack 40, respectively.

An exhaust passage 150 is formed between first cooling fan 80 and scuff plate 2. A DC-DC converter 210 is installed on a path of exhaust passage 150. DC-DC converter 210 is located between a pair of seat legs 230. DC-DC converter 210 steps down a high voltage output at the battery to a voltage that is used by auxiliaries of the vehicle such as a lamp or audio equipment, or each ECU (Electronic Control Unit) mounted on the vehicle, and charges an auxiliary battery that is not shown. An exhaust passage 100 is formed between second cooling fan 70 and scuff plate 3.

Figure 3:
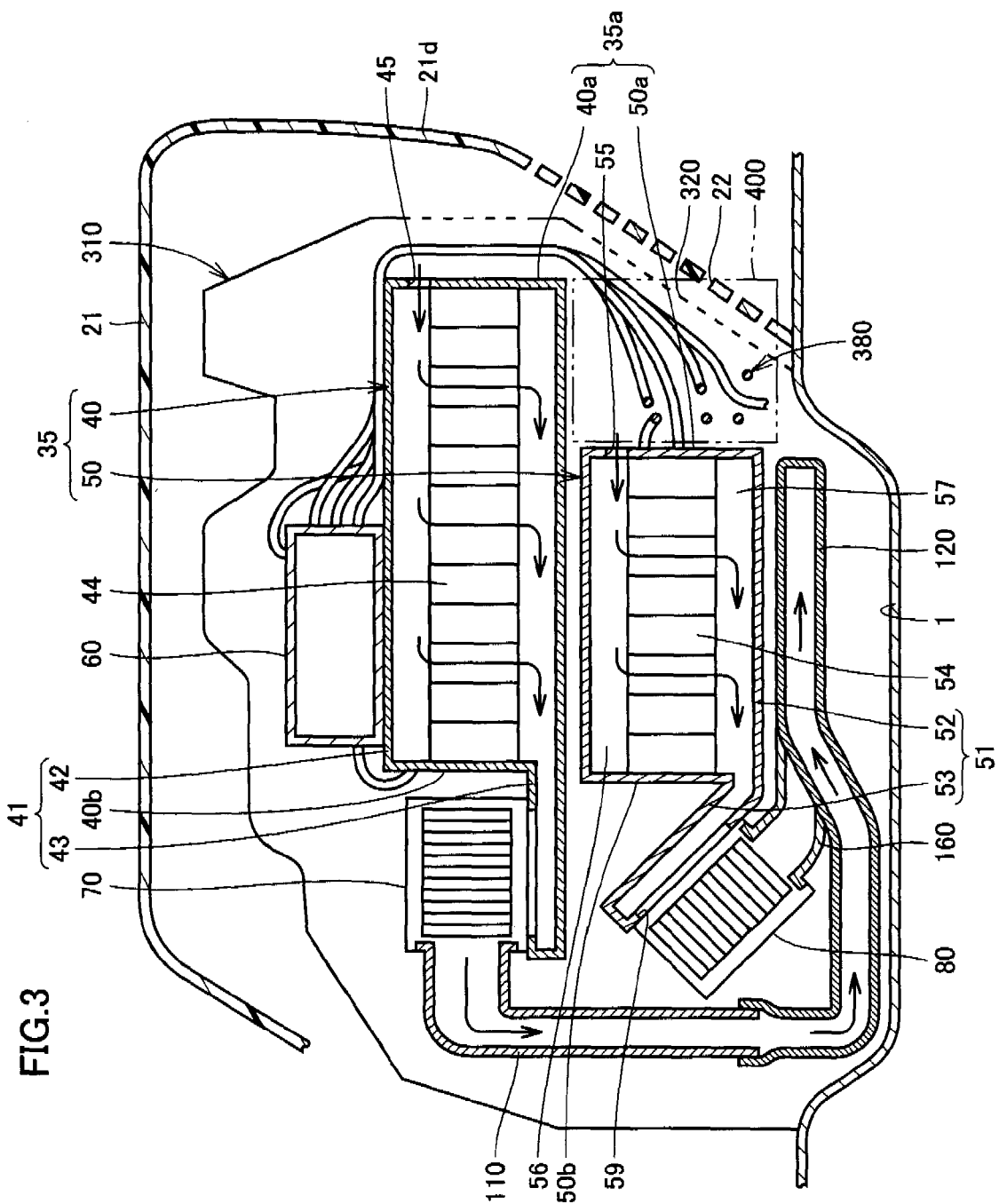
FIG. 3 is a cross-sectional view of the inside of a center console box taken along line III-III in FIG. 1.

FIG. 3 is a cross-sectional view of the inside of the center console box taken along line III-III in FIG. 1. Referring to FIGS. 2 and 3, first battery pack 50 includes batteries (secondary batteries) 54 and a battery case 51 within which batteries 54 are housed. Batteries 54 are not particularly limited as long as batteries 54 are chargeable and dischargeable secondary batteries. Batteries 54 may be, for example, nickel-hydride batteries or lithium-ion batteries.

Battery case 51 is made of metal. Battery case 51 is formed of, for example, a galvanized steel plate in order to ensure strength. Battery case 51 includes a covering portion 52 and an extended portion 53. Covering portion 52 is formed so as to surround batteries 54. Covering portion 52 is formed in a substantially rectangular parallelepiped shape having a long side direction and a short side direction when the vehicle is viewed in a plane. The long side direction of covering portion 52 corresponds with the longitudinal direction of the vehicle, and the short side direction of covering portion 52 corresponds with the vehicle width direction. Extended portion 53 projects toward the front in the longitudinal direction of the vehicle from covering portion 52.

Second battery pack 40 has the same configuration as that of first battery pack 50. Second battery pack 40 includes batteries 44 and a battery case 41. Battery case 41 includes a covering portion 42 and an extended portion 43.

Battery pack assembly 35 includes a side 35a. Covering portion 52 includes a side 50a. Covering portion 42 includes a side 40a. Side 35a is formed of side 50a and side 40a. Side 50a and side 40a are both located at the vehicle rear side. Side 50a and side 40a face the same direction. Sides 50a and 40a face the rear seats that are not shown. Side 40a is located more rear than side 50a. The distance between the not-shown rear seats and side 40a is shorter than the distance between the rear seats and side 50a.

With the above-described configuration, a recess 400 is formed in such a manner that side 35a is set back toward the vehicle front at a position adjacent to floor panel 1. Recess 400 is formed at a position facing side 50a and under second battery pack 40. Recess 400 has three sides surrounded by first battery pack 50, second battery pack 40 and floor panel 1.

Covering portion 52 further includes a side 50b. Covering portion 42 further includes a side 40b. Sides 50b and 40b face in the direction opposite to sides 50a and 40a. Sides 50b and 40b are located at the vehicle front side. First battery pack 50 and second battery pack 40 are provided such that side 50b is substantially aligned with side 40b in the longitudinal direction of the vehicle. The length of covering portion 52 in the longitudinal direction of the vehicle is shorter than the length of covering portion 42 in the longitudinal direction of the vehicle.

A plurality of wire harnesses 380 are arranged in recess 400. The plurality of wire harnesses 380 include a cable extending from first battery pack 50 and second battery pack 40. The plurality of wire harnesses 380 include a cable extending from junction box 60. The plurality of wire harnesses 380 include a cable for voltage detection to detect voltages of batteries 54 and 44, and an input/output cable through which a current flows to charge and discharge batteries 54 and 44. A current having a voltage of, for example, not smaller than 200V flows through the input/output cable.

Furthermore, a trunk cable extending between junction box 60 and DC-DC converter 210 is included in the plurality of wire harnesses 380. This trunk cable runs under seat leg 230 formed in the shape of an arch from recess 400 to DC-DC converter 210. In order to allow the foregoing routing of the trunk cable, side 50a is positioned to be located more front than back ends of seat legs 230 in the longitudinal direction of the vehicle.

The vehicle front side and the vehicle upper side of wire harnesses 380 face battery pack assembly 35. Battery pack assembly 35 is provided so as to shield wire harnesses 380 from instrument panel 31. The vehicle front side of wire harnesses 380 faces first battery pack 50 and the vehicle upper side of wire harnesses 380 faces second battery pack 40. Wire harnesses 380 are surrounded by battery pack assembly 35 and floor panel 1 at three sides, namely, the front side, the upper side and the lower side of the vehicle.

Car navigation system 32 and audio system 33 are provided at a position higher than wire harnesses 380 arranged in recess 400. Battery pack assembly 35 is provided so as to shield wire harnesses 380 from car navigation system 32 and audio system 33. Car navigation system 32 and audio system 33 are located in line with battery pack assembly 35 on a straight line extending in the longitudinal direction of the vehicle. It should be noted that electronics different from car navigation system 32 and audio system 33 may be provided at a position lower than wire harnesses 380 arranged in recess 400.

A shield cover 310 is disposed within center console box 21. Shield cover 310 is made of metal. Shield cover 310 is provided so as to surround batteries 54 and 44, wire harnesses 380 and junction box 60, together with battery cases 51 and 41. Shield cover 310 is provided to prevent an electromagnetic wave generated at batteries 54 and 44, wire harnesses 380 and junction box 60 from leaking to the inside of the vehicle compartment. A porous inlet 320 is formed in shield cover 310.

Center console box 21 includes a side 21d located at the vehicle rear side. Side 21d is provided so as to face sides 50a and 40a. Sidewall 21d is provided so as to face the rear seats that are not shown. Sidewall 21d is formed so as to be curved toward recess 400 at a position facing side 50a. At the position facing side 50a, sidewall 21d is formed so as to extend from the rear to the front in the longitudinal direction of the vehicle, toward the direction from the upper side to the lower side in the vertical direction. Sidewall 21d separates the space within center console box 21 from the inside of the vehicle compartment at recess 400. With the above-described configuration, enough legroom for the rear seats can be ensured above floor panel 1.

Figure 4:
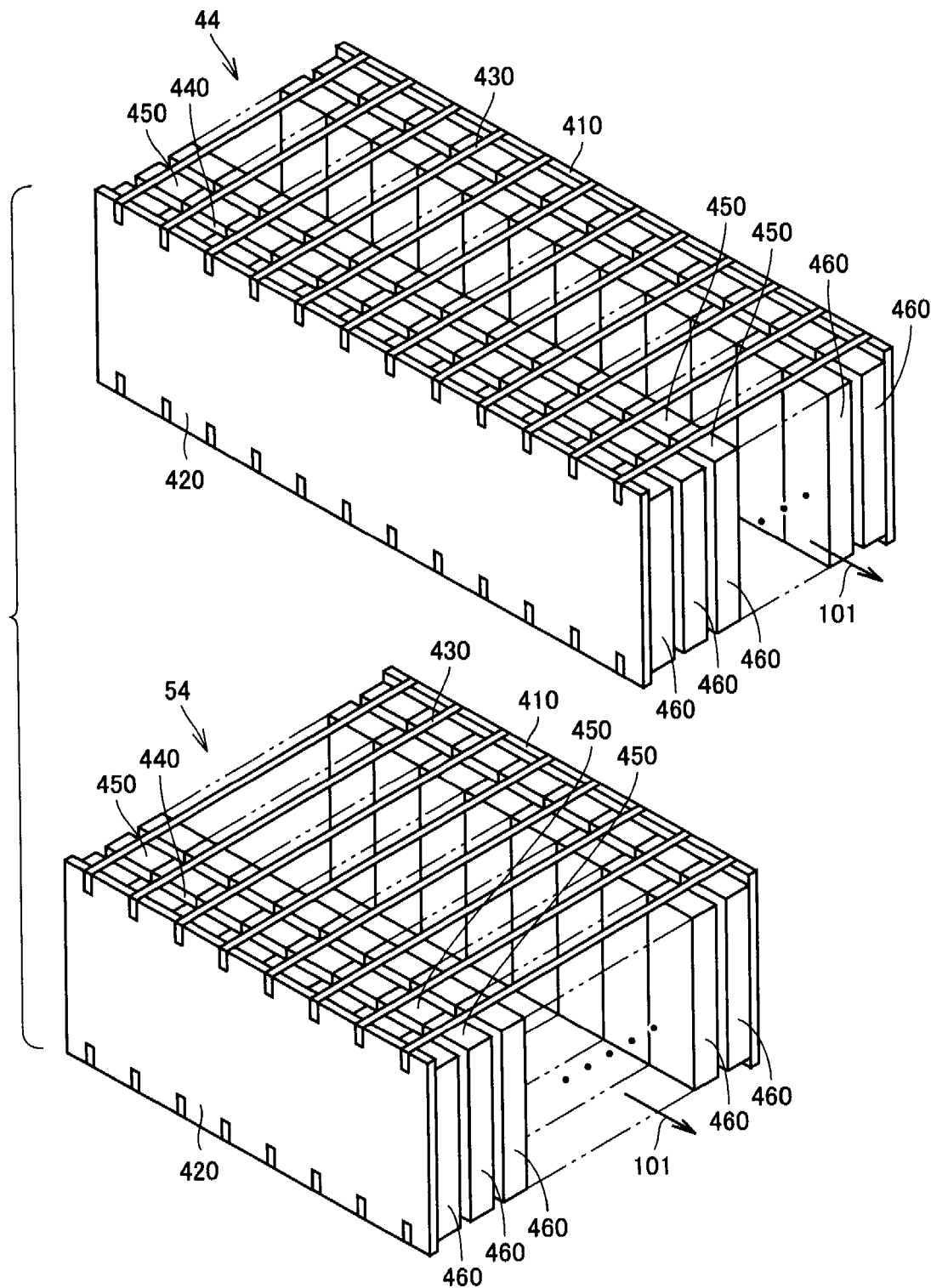
FIG. 4 is a perspective view of the batteries in FIG. 3.

FIG. 4 is a perspective view of the batteries in FIG. 3. Referring to FIG. 4, batteries 54 and 44 include a plurality of stacked battery cells 450, respectively. The plurality of battery cells 450 are stacked in the longitudinal direction of the vehicle to constitute a battery module 460. The plurality of battery modules 460 are stacked in the vehicle width direction to constitute batteries 54 and 44, respectively. On both sides of stacked battery modules 460, end plates 410 and 420 are disposed. End plate 410 and end plate 420 are linked to each other by constraining bands 430. A gap 440 through which a cooling air flows is formed between adjacent battery modules 460.

The number of battery cells 450 stacked in the direction in which side 40a projects from side 50a in FIG. 3 (in the direction shown by an arrow 101 in FIG. 4) is larger for battery 44 than for battery 54. In other words, in the longitudinal direction of the vehicle, battery 44 has the larger number of stacked battery cells 450 than battery 54. In the vehicle width direction, battery 54 has the larger number of stacked battery cells 450 than battery 44. The total number of battery cells 450 in battery 44 is larger than that in battery 54.

The number of battery cells 450 allocated in first battery pack 40 and second battery pack 50 is adjusted to establish a difference regarding the number of the stacked battery cells in the longitudinal direction of the vehicle in such a manner, so that recess 400 where wire harnesses 380 are arranged can be readily formed.

The description of cooling mechanisms provided at the power supply apparatus in FIG. 2 will follow. Referring to FIG. 3, an inlet chamber 56 and an exhaust chamber 57 are formed within battery case 51. Inlet chamber 56 is formed on the upper side of batteries 54, and exhaust chamber 57 is formed on the lower side of batteries 54. Formed in covering portion 52 is an air intake opening 55 through which air inside the vehicle compartment is taken into inlet chamber 56 as a cooling air. Air intake opening 55 opens at side 50a. The cooling air taken from air intake opening 55 to inlet chamber 56 flows through batteries 54 and exhaust chamber 57 in turn in the vertical direction. Formed in extended portion 53 is an air discharge opening 59 through which the air is discharged from the inside of battery case 51.

A path of a cooling air is also formed within battery case 41 in a manner similar to that within battery case 51. An air intake opening 45 is formed in covering portion 42. Air intake opening 45 opens at side 40a. Although a longitudinal flow method in which a cooling air flows in the vertical direction is employed in first battery pack 50 and second battery pack 40, a transverse flow method in which a cooling air flows in the horizontal direction may be employed.

First cooling fan 80 is attached to extended portion 53. First cooling fan 80 is provided to communicate with exhaust chamber 57 via air discharge opening 59. Second cooling fan 70 is attached to extended portion 43. First cooling fan 80 and second cooling fan 70 are electrically-driven sirocco fans in which air is drawn from the central portion of a rotary fan in the direction of a rotation shaft thereof and is discharged in the radial direction of the rotation shaft. It should be noted that the type of fan is not limited to a sirocco fan, but it may be, for example, a cross-flow type fan or a propeller fan.

Figure 5:
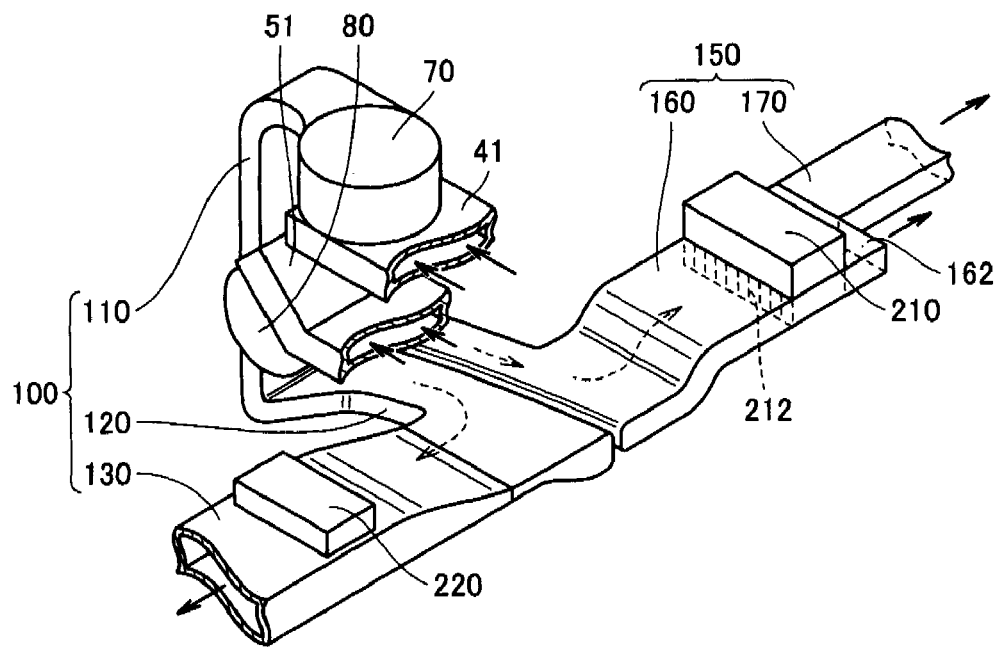
FIG. 5 is a perspective view of exhaust systems of cooling mechanisms provided at the power supply apparatus in FIG. 2.
Figure 6:
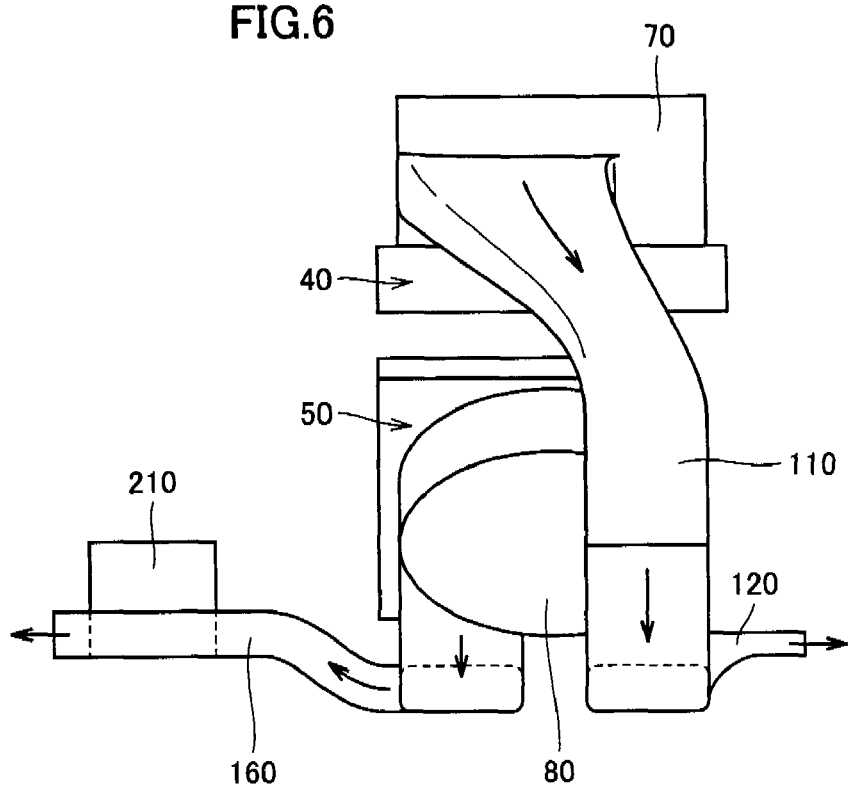
FIG. 6 is a front view of the exhaust systems of the cooling mechanisms as seen from the direction shown by an arrow VI in FIG. 2.

FIG. 5 is a perspective view of exhaust systems of the cooling mechanisms provided at the power supply apparatus in FIG. 2. FIG. 6 is a front view of the exhaust systems of the cooling mechanisms as seen from the direction shown by an arrow VI in FIG. 2. Referring to FIGS. 2 to 6, the exhaust system of the cooling mechanism provided at first battery pack 50 and the exhaust system of the cooling mechanism provided at second battery pack 40 are formed independently of each other.

Exhaust passage 150 is made up of an exhaust duct 160 and an exhaust duct 170. Exhaust duct 160 and exhaust duct 170 are provided in line from the upstream side to the downstream side of a cooling air flow in the cited order. Exhaust duct 160 is connected to first cooling fan 80. Exhaust duct 170 extends between exhaust duct 160 and scuff plate 2. Exhaust ducts 160 and 170 are provided to run under seat legs 230 formed in the shape of an arch. An outlet 162 that opens toward the cavity between floor panel 1 and floor carpet 10 is formed in exhaust duct 160.

DC-DC converter 210 is provided such that at least a part thereof is located within exhaust duct 160. In the present embodiment, DC-DC converter 210 includes cooling fins 212. Cooling fins 212 are located within exhaust duct 160.

With the above-described configuration, heat exchange is performed between the cooling air flowing through exhaust duct 160 and DC-DC converter 210, and therefore DC-DC converter 210 is cooled.

First cooling fan 80 is driven, and the negative pressure is generated within battery case 51. At this time, the air inside the vehicle compartment passes through air introduction slit 22, inlet 320 and air intake opening 55 in turn and is taken into battery case 51 as a cooling air. The cooling air taken into battery case 51 flows from inlet chamber 56 through gaps 440, during which the cooling air cools batteries 54. The cooling air having cooled batteries 54 flows out to exhaust chamber 57 and is guided to first cooling fan 80. The cooling air passes through exhaust duct 160 and a part thereof is discharged to the cavity between floor panel 1 and floor carpet 10 through outlet 162. The remaining part of the cooling air further passes through exhaust duct 170 and is discharged to cavity 4 surrounded by scuff plate 2 and floor panel 1.

Exhaust passage 100 is made up of an exhaust duct 110, an exhaust duct 120 and an exhaust duct 130. Exhaust duct 110, exhaust duct 120 and exhaust duct 130 are provided in line from the upstream side to the downstream side of a cooling air flow in the cited order. Exhaust duct 110 is connected to second cooling fan 70. Exhaust duct 130 is connected to scuff plate 3. Exhaust duct 120 extends between exhaust duct 110 and exhaust dust 120. Exhaust duct 130 is provided so as to run under seat legs 240 formed in the shape of an arch.

Audio equipment 220 is placed on a surface of exhaust duct 130. Audio equipment 220 is provided such that at least a part thereof contacts exhaust duct 130 outside the duct.

Second cooling fan 70 is driven, and the negative pressure is generated within battery case 41. At this time, the air inside the vehicle compartment passes through air introduction slit 22, inlet 320 and air intake opening 45 in turn and is taken into battery case 41 as a cooling air. The cooling air taken into battery case 41 flows through gaps 440, during which the cooling air cools batteries 44. The cooling air having cooled batteries 44 is guided to second cooling fan 70. The cooling air passes through exhaust duct 110, exhaust duct 120 and exhaust duct 130 in turn and is discharged to cavity 5 surrounded by scuff plate 3 and floor panel 1.

In the present embodiment, the total number of stacked battery cells 450 is relatively small in first battery pack 50 and is relatively large in second battery pack 40. Therefore, a pressure loss in a cooling air flow becomes relatively small within first battery pack 50, and a pressure loss in a cooling air flow becomes relatively large within second battery pack 40. In order to address this, DC-DC converter 210 is provided on the path of exhaust passage 150 connected to first battery pack 50. Therefore, a difference between a pressure loss on a path of a cooling air flowing through first battery pack 50 and exhaust passage 150 in turn and a pressure loss on a path of a cooling air flowing through second battery pack 40 and exhaust passage 100 in turn can be lessened. As a result, even if the same type of fans are used for first cooling fan 80 and second cooling fan 70, a timing when first cooling fan 80 operates and a timing when second cooling fan 70 operates can be set to be substantially equal.

The structure for mounting the power supply apparatus on the vehicle in the embodiment of the present invention includes driver's seat 11 serving as a first seat and passenger's seat 12 serving as a second seat that are installed within the vehicle compartment and aligned in the vehicle width direction, instrument panel 31 provided at the vehicle front inside the vehicle compartment and equipped with car navigation system 32 and audio system 33 serving as electronics, battery pack assembly 35 located between driver's seat 11 and passenger's seat 12 and serving as a power supply portion, and wire harnesses 380 electrically connected to battery pack assembly 35 and serving as electrical components. The vehicle front side and the vehicle upper side of wire harnesses 380 face battery pack assembly 35.

According to the power supply apparatus in the embodiment of the present invention configured in the above-described manner, wire harnesses 380 are located in recess 400 having three sides surrounded by first battery pack 50, second battery pack 40 and floor panel 1. Therefore, arrival of an electromagnetic wave emitted from wire harnesses 380 at car navigation system 32 and audio system 33 provided at instrument panel 31 can be suppressed. As a result, troubles such as a malfunction caused by these electronics due to the electromagnetic wave can be avoided.

FIGS. 7A-7D are schematic diagrams of modifications of the power supply apparatus in FIG. 2. The above-described effects can also be obtained by the modifications that will be described hereinafter.

Figure 7A:
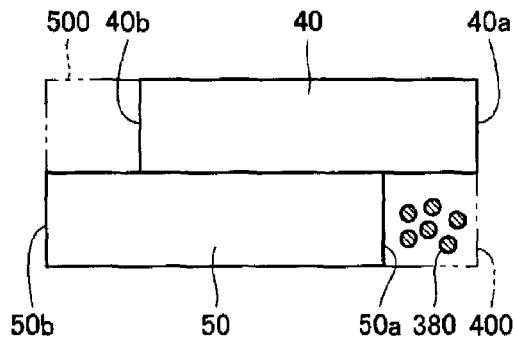
FIGS. 7A-7D are schematic diagrams of modifications of the power supply apparatus in FIG. 2.

Referring to FIG. 7A, in the present modification, first battery pack 50 and second battery pack 40 are provided such that side 40a is located more rear than side 50a, and side 50b is located more front than side 40b. A recess 500 is formed at a position facing side 40b and on first battery pack 50. The provision of recess 500 allows the battery packs to be located, for example, without contacting constructions on the main body side of the vehicle.

Figure 7B:
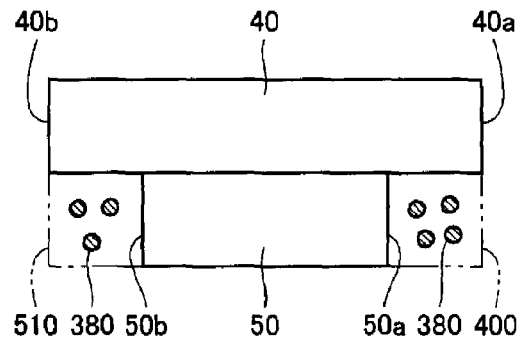

Referring to FIG. 7B, in the present modification, first battery pack 50 and second battery pack 40 are provided such that side 40a is located more rear than side 50a, and side 40b is located more front than side 50b. A recess 510 is formed at a position facing side 50b and under second battery pack 40. With the above-described configuration, wire harnesses 380 through which a relatively low-voltage current flows can be arranged in recess 510.

Figure 7C:
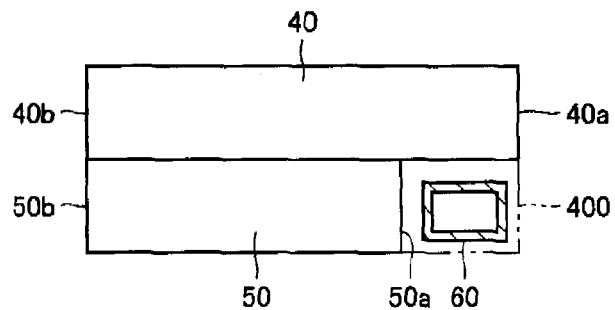

Referring to FIG. 7C, in the present modification, junction box 60 is disposed in recess 400. In addition to this, DC-DC converter 210 may be located in recess 400.

Figure 7D:
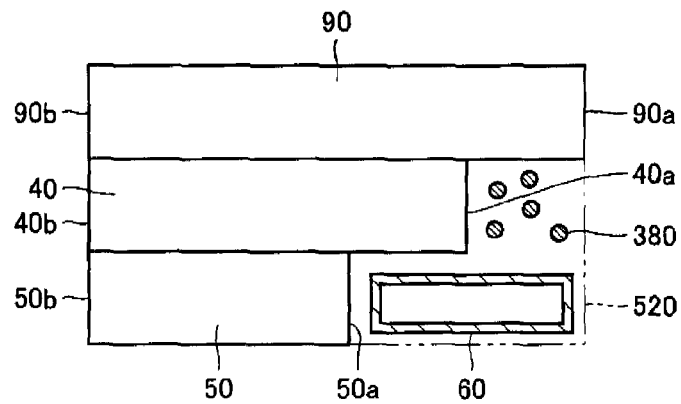

Referring to FIG. 7D, in the present modification, a third battery pack 90 is provided on second battery pack 40. Third battery pack 90 includes a side 90a facing the same direction as sides 50a and 40a, and a side 90b facing the same direction as sides 40b and 50b. Third battery pack 90 is provided such that side 90a is located more rear than sides 50a and 40a, and side 90b is located at a position where side 90b is substantially aligned with sides 50a and 40b in the longitudinal direction of the vehicle. A recess 520 is formed at a position facing sides 40a and 50a and under third battery pack 90. Wire harnesses 380 and junction box 60 are located in recess 520.

Although the present invention is applied to the power supply apparatus that is installed within center console box 21 in the present embodiment, it is not limited thereto. The present invention is also applicable to a power supply apparatus that is installed between rear seats divided into right and left.

Furthermore, the present invention is also applicable to a fuel cell hybrid vehicle (FCHV) employing a fuel cell and a secondary battery as a driving source, or to an electric vehicle (EV). In the hybrid vehicle of the present embodiment, an internal combustion engine is driven at an operating point of optimum fuel efficiency, whereas, in the FCHV, a fuel cell is driven at an operating point of optimum electric power generation efficiency. A secondary battery is used in both hybrid vehicles in basically the same manner.

In addition, the power supply portion in the present invention is not limited to a secondary battery (battery), but may be a capacitor or a fuel cell. The capacitor refers to an electric double layer capacitor that principally actuates by the use of an electric double layer formed at an interface between activated carbon and an electrolytic solution. By using the activated carbon as a solid and the electrolytic solution (an aqueous solution of dilute sulfuric acid) as a liquid in contact with each other, positive and negative electrodes are relatively distributed at very short intervals on the interface. When a pair of electrodes is dipped in an ionic solution with the application of a voltage to such an extent as not to generate electrolysis, ions are adsorbed onto the surface of each electrode, whereby positive and negative electricity is stored (i.e., electric charge). When the electricity is discharged to the outside, positive and negative ions are separated from the electrodes, so that neutralization is regained (i.e., electric discharge).

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

INDUSTRIAL APPLICABILITY

The present invention is mainly applied to a hybrid vehicle including an internal combustion engine and a power supply, a fuel cell hybrid vehicle employing a fuel cell and a secondary battery as a driving source, and an electric vehicle.

The invention claimed is:

1. A structure for mounting a power supply apparatus on a vehicle, comprising:
a first seat and a second seat installed within a vehicle compartment and aligned in a vehicle width direction;
an instrument panel installed at a vehicle front inside the vehicle compartment and equipped with electronics;
a power supply portion located between said first seat and said second seat; and
an electrical component electrically connected to said power supply portion,
a vehicle front side and a vehicle upper side of said electrical component facing said power supply portion.

2. The structure for mounting a power supply apparatus on a vehicle according to claim 1, wherein
said electronics are provided at a position higher than said electrical component.

3. The structure for mounting a power supply apparatus on a vehicle according to claim 1, wherein
said power supply portion includes a side located at a vehicle rear side, and
a recess is formed in such a manner that said side is set back toward a vehicle front, and said electrical component is located in said recess.

4. The structure for mounting a power supply apparatus on a vehicle according to claim 3, wherein
said power supply portion includes a first power supply portion and a second power supply portion,
said first power supply portion and said second power supply portion have a first side and a second side, respectively, located at the vehicle rear side, and
said recess is formed in such a manner that said second power supply portion is provided on said first power supply portion, and said second side is located more rear than said first side.

5. The structure for mounting a power supply apparatus on a vehicle according to claim 4, further comprising
a metallic floor panel provided on a floor inside the vehicle compartment, wherein said first power supply portion is installed on said floor panel, and said electrical component has three sides surrounded by said first power supply portion, said second power supply portion and said floor panel.

6. The structure for mounting a power supply apparatus on a vehicle according to claim 4, wherein said first power supply portion and said second power supply portion include a plurality of power supply cells that are stacked and electrically connected to one another, respectively, and the power supply cells that are included in said second power supply portion and stacked in a longitudinal direction of the vehicle are larger in number than the power supply cells that are included in said first power supply portion and stacked in the longitudinal direction of the vehicle.

7. The structure for mounting a power supply apparatus on a vehicle according to claim 4, wherein said first power supply portion and said second power supply portion include a plurality of power supply cells that are stacked and electrically connected to one another, respectively, and the power supply cells included in said second power supply portion are larger in number than the power supply cells included in said first power supply portion, the structure for mounting a power supply apparatus on a vehicle further comprising:

a first exhaust passage through which a cooling air having cooled said plurality of power supply cells is discharged from said first power supply portion; and a second exhaust passage through which a cooling air having cooled said plurality of power supply cells is discharged from said second power supply portion, wherein said first exhaust passage and said second exhaust passage extend independently of each other, and electrical equipment is installed on a path of said first exhaust passage.

8. The structure for mounting a power supply apparatus on a vehicle according to claim 3, wherein said first seat and said second seat include a driver's seat and a passenger's seat, respectively, the structure for mounting a power supply apparatus on a vehicle further comprising:

a center console installed between said driver's seat and said passenger's seat and housing said power supply portion; and a rear seat installed at a vehicle rear of said driver's seat and said passenger's seat, wherein said center console includes a sidewall located at the vehicle rear side and curved toward said recess.

9. The structure for mounting a power supply apparatus on a vehicle according to claim 1, wherein said electrical component is located between said first seat and said second seat.

* * * * *